(12) United States Patent
Bathe et al.

(10) Patent No.: US 7,195,103 B2
(45) Date of Patent: Mar. 27, 2007

(54) OIL SUPPLYING DEVICE

(75) Inventors: Kurt Bathe, Brandenburg (DE); Dirk Blechschmidt, Brandenburg (DE); Jens Cizmarik, Belzig (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 648 days.

(21) Appl. No.: 10/474,598

(22) PCT Filed: Apr. 16, 2002

(86) PCT No.: PCT/EP02/04177

§ 371 (c)(1),
(2), (4) Date: Oct. 9, 2003

(87) PCT Pub. No.: WO02/086354

PCT Pub. Date: Oct. 31, 2002

(65) Prior Publication Data

US 2004/0108168 A1    Jun. 10, 2004

(30) Foreign Application Priority Data

Apr. 21, 2001    (DE) ................................ 101 19 573

(51) Int. Cl.
*F01M 1/00* (2006.01)
(52) U.S. Cl. .................... 184/13.1; 184/65; 74/473.36
(58) Field of Classification Search ............... 184/13.1, 184/11.4, 65; 74/473.36; 384/375, 392
See application file for complete search history.

(56) References Cited

U.S. PATENT DOCUMENTS

| 3,529,698 A | * | 9/1970 | Nelson | ................ 184/6.12 |
| 4,231,266 A | * | 11/1980 | Nishikawa et al. | ........... 74/467 |
| 4,329,887 A | | 5/1982 | Kawamto | .................... 74/467 |
| 5,799,540 A | * | 9/1998 | Diehl et al. | .............. 74/473.37 |
| 6,223,858 B1 | * | 5/2001 | Ubagai et al. | ............. 184/11.2 |
| 6,374,951 B1 | * | 4/2002 | Michelhaugh et al. | ..... 184/13.1 |
| 2005/0230215 A1 | * | 10/2005 | Kimura et al. | ............. 192/48.8 |

FOREIGN PATENT DOCUMENTS

| DE | 195 38 192 A1 | 4/1997 |
| DE | 196 02 041 A1 | 7/1997 |
| DE | 199 12 328 A1 | 9/2000 |
| FR | 2 751 726 | 1/1998 |
| GB | 1 253 179 | 11/1971 |
| GB | 2 166 816 A | 5/1986 |

\* cited by examiner

*Primary Examiner*—David M. Fenstermacher
(74) *Attorney, Agent, or Firm*—Davis Bujold & Daniels, P.L.L.C.

(57) ABSTRACT

An oil supplying device (34, 36, 38) for a vehicle transmission (2) having one transmission housing (4, 6) with gears (10, 12, 16, 18, 22) situated upon shafts (8, 14, 20) and having teeth, bearings in which gears (10, 12, 16, 18, 22) and shafts (8, 14, 20) are rotatably mounted and one switch gear (30, 32, 50) suited to connect the gears (10, 12, 16, 18, 22) and shafts (8, 14, 20) for a transmission of torque. The device has an oil collecting duct (34) arranged on movable elements (32, 50) of the switch gear (30, 32, 50) which moves with the elements (32, 50) of the switch gear (30, 32, 50) and which extends substantially through the part in the transmission housing (4, 6) having all the gears (10, 12, 16, 18, 22). The oil collecting duct (34) has at least one opening (36, 38) which during movements of the elements (32, 50) of the switch gear (30, 32, 50) coats areas within the transmission housing (4, 6) on which the bearings and teeth are situated.

11 Claims, 4 Drawing Sheets

OIL SUPPLYING DEVICE

This application is a national stage completion of PCT/EP02/04177 filed Apr. 16, 2002 which claims priority from German Application Ser. No. 101 19 573.7 filed Apr. 21, 2001.

FIELD OF THE INVENTION

The invention relates to an oil supplying device.

BACKGROUND OF THE INVENTION

In transmission and particularly in manually operated transmissions, the oiling of the teeth, the bearings and of the idler gear bearings in the shafts has a special significance because of the complex design of the transmissions. On one hand, a sufficient oiling of the teeth and of the bearings has to be obtained and, on the other, a smallest possible amount of oil must ensure a small drag torque to achieve a good shifting characteristic which has great influence on the evaluation of the comfort, especially in manually operated transmissions. The oil temperature, likewise, must be moderate and the oil supply of the reverse gear wheel, the same as cold shifting characteristic, must be ensured. To solve the problems related thereto, different kinds of oil pumps, trepanned shafts and oil pipes are used, or oil baffle plates, oil ducts or raised oil levels are used in the transmission. When the gear wheels immerse in the oil, the latter is randomly distributed in the transmission according to rotational speed, gear and driving mode of the vehicle. With stationary oil guiding devices, it has been sought purposefully to guide the oil. In case of a helical cut of the parts, there results a conveyance of the oil into the oil pan in the direction preset by the helical cut with the result of a variable accumulation of oil in the oil pan.

DE 195 38 192 A1 has disclosed, as example, an oil supplying device stationarily situated in the transmission housing as oil collecting device, oil tank and oil supply device. To distribute, over a large area oil accumulated in another large area cannot be ensured with this arrangement. DE 196 02 041 A1 has made a shift fork known for a variable gear transmission which has a device for supplying oil spray to the synchronizer mechanism and Is actuated with the shift fork. An overload of the synchronizer mechanism is to be prevented only by providing the mechanism a directed sequence which furnishes additional lubricant oil to the synchronizer mechanism during asynchronism. The device for supplying oil does not serve for better oiling of a multiplicity of parts in the transmission.

The problem on which the invention is based is to improve the oiling in a transmission, especially in a manually operated transmission of a motor vehicle.

SUMMARY OF THE INVENTION

According to the invention, one oil supplying device is proposed in a vehicle transmission with which the existing oil is brought to the places provided for oiling. The vehicle transmission has one housing with gears having teeth disposed upon shafts with bearings on which gears and shafts are rotatably supported and with a switch gear suitable for connecting the gears and shafts for transmitting torque. One oil collecting duct is provided which is disposed upon movable elements of the switch gear and moves with the elements of the switch gear. The oil collecting duct extends substantially through the part in the transmission having all the gears and has at least one opening which, during movement of the elements of the switch gear, coats areas within the transmission housing in which the bearings, teeth or synchronizer mechanisms are located. In an especially advantageous development where a separating device, especially in the form of a partition plate, is provided in the area of an oil pan in the transmission housing which divides a first area having a low oil level from a second area having a high oil level. The oil collecting duct conveys oil sprayed from the first area with the low oil level to the second area with the high oil level, since in the first area gears of larger diameter can engage more deeply in the oil and in the second area gear wheels of smaller diameter can engage less deeply in the oil. In one other development, at least one of the openings of the oil collecting duct is disposed in a manner such that, at least in one defined position of its movement, it can deliver oil to a second oil collecting duct which is stationarily situated in the transmission housing or on a shifting element. The oil collecting duct advantageously has a slope so that in normal position of the transmission, the oil can flow assisted by the force of gravity in the oil collecting duct. In one embodiment, the oil collecting duct moves in longitudinal direction of the transmission housing along the axes of rotation of the shafts and, in another embodiment, the oil collecting duct moves at right angles with the longitudinal direction of the transmission housing and thus at right angles with the axes of rotation of the shafts. One development shows the oil collecting duct mounted upon a selector shaft movable in longitudinal direction of the transmission and one other development shows the oil collecting duct mounted upon a locking plate which is provided for locking shift forks of the switch gear not selected for shifting and which is movable at right angles with the longitudinal direction of the transmission. The oil collecting duct is advantageously made of lightweight resistant plastic material and apt to be self-lockingly engaged in corresponding receiving sections of the supporting switch gear, for example, as injection molding part. Aside from the tying of a partition in the oil pan it is also possible to change the outline of the housing which results in a separation of different oil spaces. Hereby an increased oil level is produced in the dynamic operation of the transmission in order that teeth with small pitch diameters can be sufficiently supplied with oil to prevent damage to the teeth. In order that oil, which has been transported, for example, forwardly, to the bottom area of the oil pan as result of the housing designs and of the helical cut of the gear wheels in the transmission housing, is again purposefully conveyed through the teeth to the rear space behind the partition during high pitch, the oil collecting duct is mounted above the gear wheels in the form of an active duct. The oil collecting duct identifies actively with the movement of the shifting elements, collects oil spray and lets it flow in preset directions, there being mounted in the oil collecting duct purposeful openings or outflows to guide the oil flow to specific groups or parts such as synchronizer mechanisms, bearings or gears. Thus a sufficient oiling of the transmission is obtained. By virtue of the movement of the supporting parts upon which the active oil collecting duct is, whole areas are coated and supplied with oil according to the existing gear position of the switch gear.

BRIEF DESCRIPTION OF THE DRAWINGS

The invention will now be described, by way of example, with reference to the accompanying drawings in which.

DETAILED DESCRIPTION OF THE INVENTION

Figure 1:
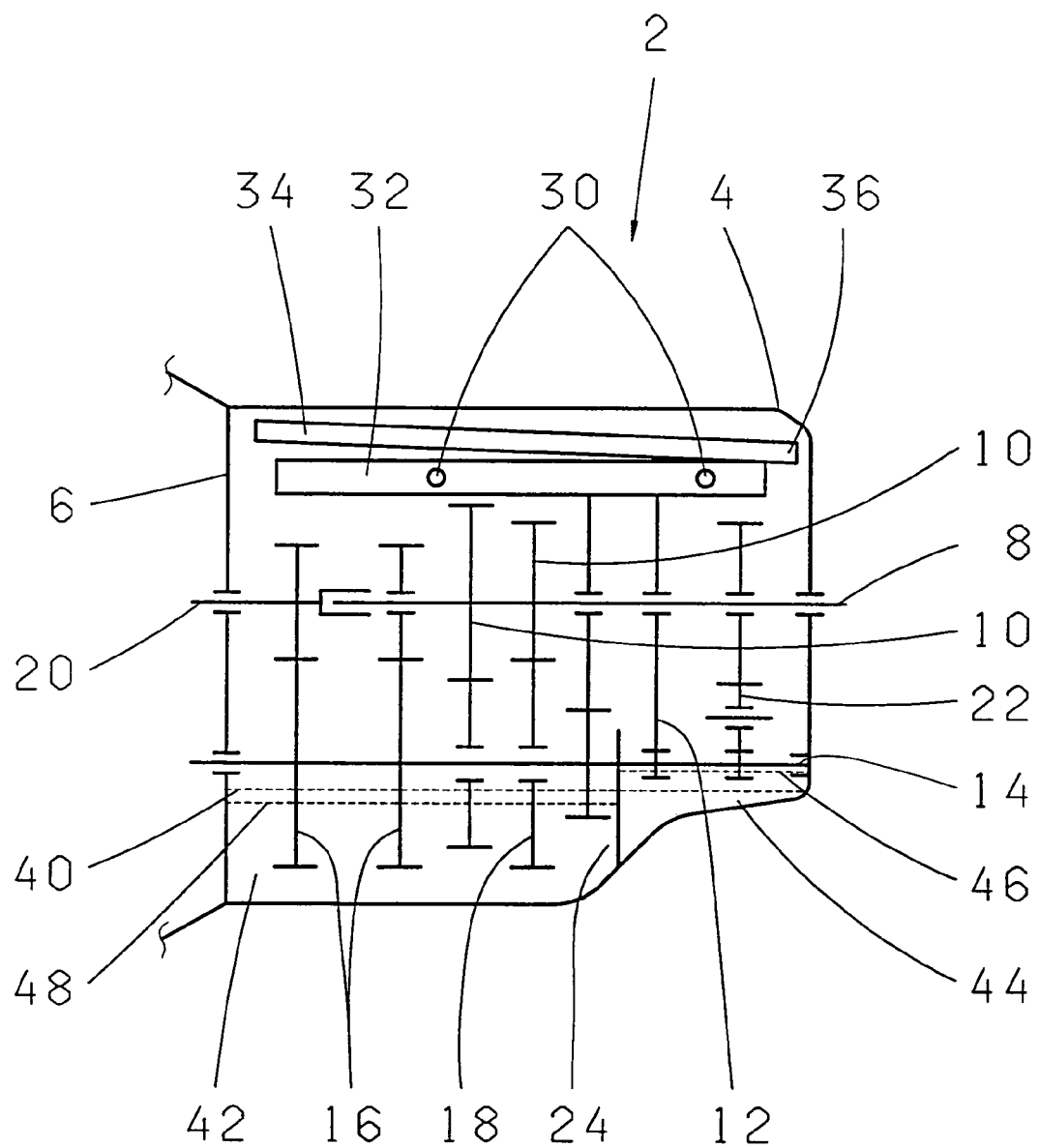
FIG. 1 is a side view of a transmission housing with oil collecting duct and partition.
Figure 2:
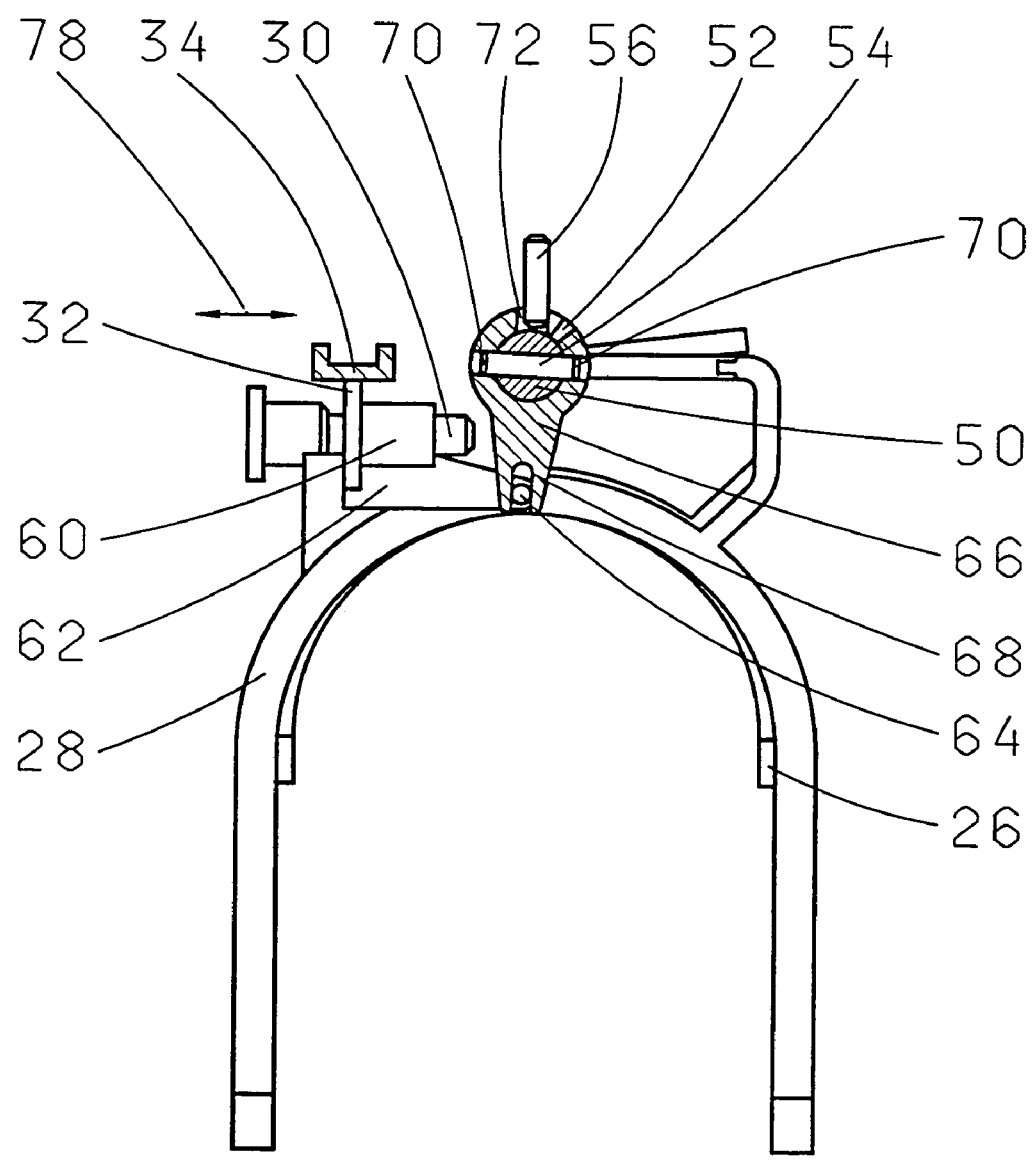
FIG. 2 is a section through a switch gear with oil collecting duct.

A transmission 2 is shown in FIG. 1, which comprises one housing rear part 4 with a raised bottom and one housing front part 6, one main shaft 8 with fixed gears 10 and idler gears 12, one countershaft 14 with fixed gears 16 and idler gears 18, one input shaft 20, one reverse intermediate gear 22 and one partition 24. Above the main shaft 8 are selector forks 28 supported in the housing parts 4 and 6 by bearing pins 26 (FIG. 2) and a locking plate 32 passed into the guide pins 30. Upon the locking plate 32 is superimposed an oil collecting duct 34 inclined in direction to the housing rear part 4 and having oil outflows 36 and 38. The oil level height in a normal position 40 is determined by the amount of oil and the height of the partition 24 which, in the embodiment shown, is configured so that in both oil areas or oil spaces 42 and 44 equal levels of oil exist. During operation of the transmission 2 the oil is upwardly spun by the different gears 10, 12, 16, 18 to the shafts 8, 14, 20. During operation the helical gearing of the gears 10, 12, 16, 18 conveys the oil forwardly into the housing part 6. There the larger gear wheels 16, 18 engage deeper in the oil existing in the oil area 44 and can spin up enough oil. In the housing rear part 4 with the raised bottom, the gear wheels of the countershaft located there do not engage as deeply in the oil existing in the oil area 44 and, accordingly, cannot spin up so much oil. By the active oil collecting duct 34, the spun oil is collected in the housing front part 6 and by virtue of the inclination is transported in direction to the housing rear part 4 and there purposefully delivered for oil supply via the inserted oil outflows 36 and 38 to specific areas according to the existing shift position. Thereby the oil level 46 rises during operation behind the partition 24 in the oil area 44. The partition 24 prevents a quick forward reflux. In the raised oil level 46, the gearwheels can now immerse deeper in the oil area 44 and maintain a sufficient oil supply. The oil level 48 in the oil area 42 lowers somewhat, but it is, likewise, enough for the teeth and bearings to be oiled there.

Figure 3:
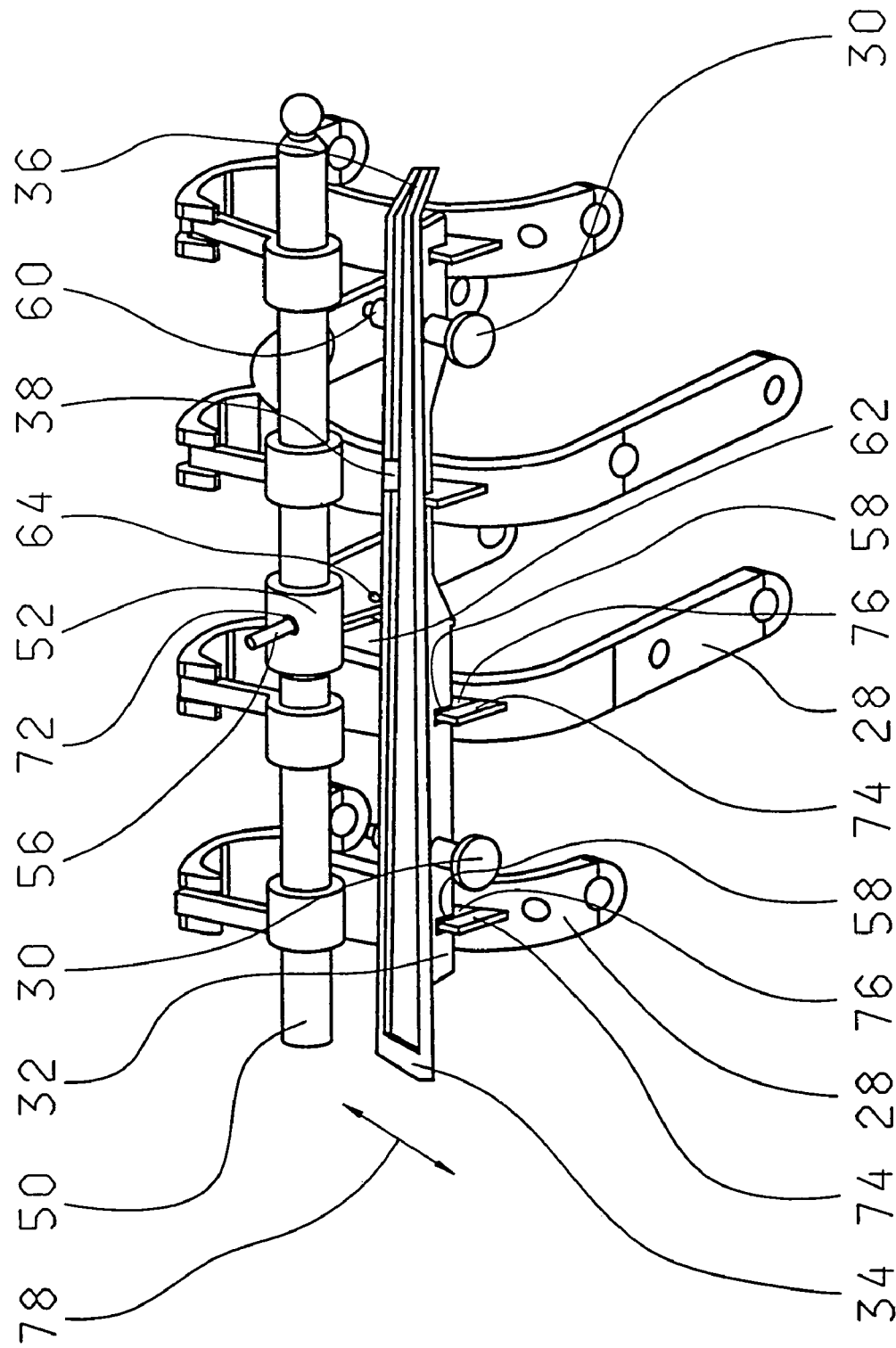
FIG. 3 is an oblique view with oil collecting duct upon a locking plate.

The one-rod switch gear for the manually operated transmission has one central selector shaft 50 which is rotatably and axially movably supported in the transmission housing 4, 6. The locking device has one locking plate 32, two guide pins 30, one lever hub 52, one driving pin 54 and one detent pin 56. In the embodiment shown, the locking plate 32 is provided with four recesses 58, two guide sleeves 60 and one rigid sliding member 62 each of which is disposed vertically relative to the locking plate 32. The locking plate proper is disposed parallel with the central selector shaft 50 and is movably supported on the two guide pins 30 fixedly connected with the housing 4, 6. The rigid sliding member 62 has one pin 64 parallel with the locking plate 32 on one end. Coaxially and movably relative to the central selector shaft 50, the lever hub 52 is provided which, together with an extension part 66, forms one lever; on the lower, free end of the extension part 66, a slotted hole 68 is provided in which engages the pin 64 of the locking plate 32. The lever hub 52 has one or two grooves 70 from one end or the other on its inner diameter in which engages the driving pin 54 disposed across the central selector shaft 50. On the outer diameter of the lever hub 52 is an arched recess 72 extending across the central selector shaft 50 and in which engages the detent pin 56 arranged fixedly to the housing. On the shifting elements designed as selector forks 28 or push forks are arranged across the locking plate 32 locking elements 74 which have longitudinal grooves 76 offset relative each other in transverse direction. In FIG. 3, the oil collecting duct 34 with its openings 36 and 38 (shown here) is fastened on the locking plate 32.

Therefore, when selecting a gate, that is, by rotating the central selector shaft 50, the lever hub 52 is turned via the driving pin 54. Via the push-swivel joint arranged between the lever hub 52 and the rigid sliding member 62 of the locking plate 32, the rotary movement is converted to a longitudinal movement and the locking plate 32 is moved upon its guide pin 30 across the central selector shaft 50 according to the rotating position of the central selector shaft 50. Thereby the oil collecting duct 34 moves also along the arrow 78. The recesses 58 in the locking plate 32 engage via the locking elements 74 on the selector forks 28. In the areas between the individual switch gates, the locking surfaces on the recesses 58 overlap with the locking surfaces of the locking elements 74 on all selector forks 28. If the torsion path for reaching a shift gate has been covered, then the locking plate 32 aligns with the corresponding longitudinal groove 76 of the locking element 74 of the respective selector fork 28 which shifts the gear or gears in the preselected shift gate. The selector fork 28 or the sliding fork is thus free in longitudinal direction and can be shifted. In all other selector forks or sliding forks, the locking surfaces on the locking plate 32 overlap with the locking surfaces on the locking elements 74 of the swing forks, since the longitudinal grooves 76 in the locking elements 74 are arranged offset relative to each other depending on the rotation path selected. Said selector forks 28 or sliding forks are thus stopped.

To shift a gear, the central selector shaft 50 is moved in longitudinal direction relative to the housing 4, 6 and thus to the locking plate 32. The construction of the locking means requires a lever hub 52 stationary in longitudinal direction. To this end, the lever hub 52 is fixed in longitudinal direction via the detent pin 56 fixed to the housing. On the other hand, when the central selector shaft 50 is rotated, the lever hub 52 is guided along in its outer arched groove 72 on the detent pin 56. When the central selector shaft 50 moves, the driving pin 54 slides along the longitudinal grooves 70 on the inner diameter of the lever hub 52.

Figure 4:
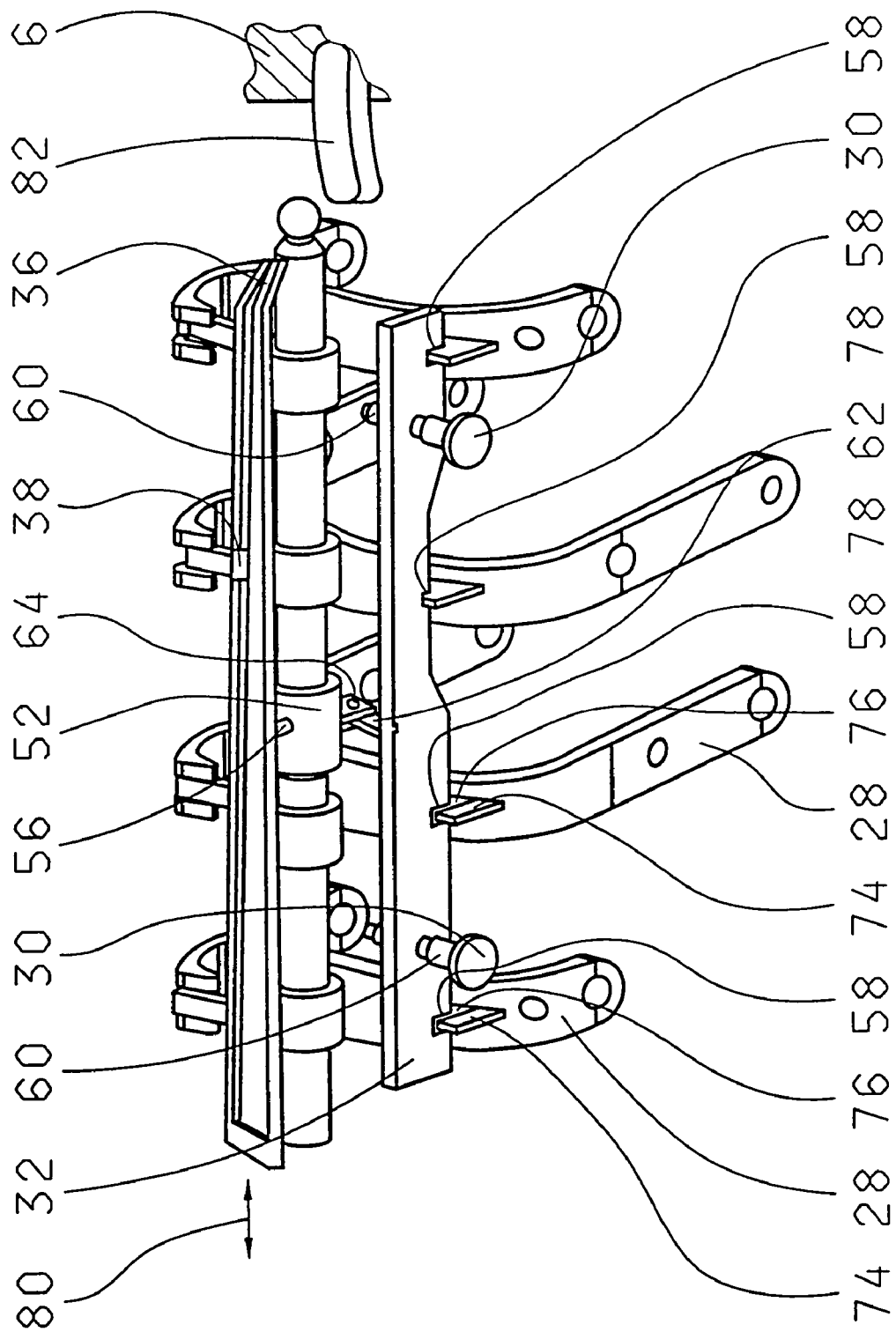
FIG. 4 is an oblique view with oil collecting duct upon a selector shaft.

In FIG. 4, the oil collecting duct is fastened on the selector shaft 50 and moved in shifting direction according to the arrow 80. One other oil collecting duct 82, which is diagrammatically shown as situated in the transmission housing 6, is reached by the oil collecting duct 34 moving along the arrow 80 only in certain positions of the selector shaft 50 and only then can it deliver oil to the other oil collecting duct 82 via the oil outflow 36.

REFERENCE NUMARALS 2 transmission
4 housing rear part
6 housing front part
44 oil area
46 oil level
48 oil level 8 main shaft 50 selector shaft
10 fixed gear 52 lever hub
12 idler gear 54 driving pin
14 countershaft 56 detent pin
16 fixed gear 58 recess
18 idler gear 60 guide sleeve
20 input shaft 62 sliding member
22 reverse gear intermediate gear 64 pin
24 partition 66 extensive part
26 bearing pin 68 slot
28 selector fork 70 groove
30 guide pin 72 recess
32 locking plate 74 locking element
34 oil collecting duct 76 longitudinal groove
36 oil outflow 78 arrow
38 oil outflow 80 arrow
40 rest position 82 oil collecting duct
42 oil area

The invention claimed is:

1. An oil supplying device (34, 36, 38) for a vehicle, the oil supply device being accommodated within a transmission (2) having a housing (4, 6) with a plurality of gears (10, 12, 16, 18, 22) disposed therein upon shafts (8, 14, 20), and a switch gear (30, 32, 50) suited to connect said gears (10, 12, 16, 18, 22) and the shafts (8, 14, 20) for a torque transmission,
   wherein the transmission (2) has a separating device (24) which separates a first housing part (6) from a second housing part (4) and an oil collecting duct (34) is situated upon movable elements (32, 50) of said switch gear (30, 32, 50) and moves with said elements (32, 50) of said switch gear (30, 32, 50), and the oil collecting duct (34) extends from adjacent a first end of the transmission housing (4, 6) over the plurality of gears (10, 12, 16, 18, 22) to adjacent an opposed second end of the transmission housing and has at least one opening (36, 38) therein, and the oil collecting duct (34), during operation of the transmission (2), collects oil from the first housing part (6) and conveys the collected oil over the separating device (24) and deposits the oil in the second housing part (4).

2. The oil supplying device (34, 36, 38) according to claim 1, wherein said separating device (24) separates a first area (42) located in the first housing part (6), with a low oil level (48), from a second area (44) located in the second housing part (4), with a high oil level (46), and said oil collecting duct (34) conveys oil sprayed from said first area (42) to said second area (44).

3. The oil supplying device (34, 36, 38) according to claim 2, wherein at least one of said openings (36, 38) of said oil collecting duct (34) is arranged in a manner such that, at least in a defined position of movement, the opening can deliver oil to a second oil collecting duct (82) which is fastened to one of said transmission housing (4, 6) and a switching element.

4. The oil supplying device (34, 36, 38) according to claim 1, wherein said oil collecting duct (34) has a slope so that, the oil normally flows, assisted by gravity, along said oil collecting duct (34) into the second area (44).

5. The oil supplying device (34, 36, 38) according to claim 1, wherein said oil collecting duct (34) moves in a longitudinal direction of said transmission housing (4, 6) along axes of rotation of said shafts (8, 14, 20).

6. The oil supplying device (34, 36, 38) according to claim 5, wherein said oil collecting duct (34) is mounted upon a selector shaft (50) movable in a longitudinal direction of said transmission housing (4, 6).

7. The oil supplying device (34, 36, 38) according to claim 1, wherein said oil collecting duct (34) moves at right angles to a longitudinal direction of said transmission housing (4, 6) and thus at right angles with axes of rotation of said shafts (8, 14, 20).

8. The oil supplying device (34, 36, 38) according to claim 7, wherein said oil collecting duct (34) is mounted upon a locking plate (32) which is provided for locking shaft forks of said switch gear (30, 32, 50) not selected for shifting and is movable at right angles with the longitudinal direction of said transmission housing (4, 6).

9. The oil supplying device (34, 36, 38) according to claim 1, wherein said oil collecting duct (34) is made of a resistant plastic material.

10. An oil supplying device (34, 36, 38) for a vehicle, the oil supply device being accommodated within a transmission (2) having a housing (4, 6) with having a plurality of gears (10, 12, 16, 18, 22) disposed therein upon shafts (8, 14, 20), and a switch gear (30, 32, 50) is associated with the plurality of gears (10, 12, 16, 18, 22) and the shafts (8, 14, 20) to facilitate torque transmission by the transmission (2);
   wherein the transmission (2) has a separating device (24) which separates an oil collection reservoir (42) of a first housing part (6) from an oil collection reservoir (44) of a second housing part (4), and the second housing part (4) of the transmission (2) has a raised bottom;
   an oil collecting duct (34) is supported upon movable elements (32, 50) of the switch gear (30, 32, 50) and the oil collecting duct (34) moves with the movable elements (32, 50) of the switch gear (30, 32, 50), the oil collecting duct (34) extends over the separating device (24) and has a first end which communicates with the first housing part (6) and a second end which communicates with the second housing part (4), and the oil collecting duct (34) is inclined, from the first housing part (6) toward the second housing part (4), so that oil, collected by the oil collecting duct (34) during operation of the transmission (2), flows along the oil collecting duct (34) toward the second housing part (4) to convey the collected oil into the oil collection reservoir (44) of the second housing part (4).

11. An oil supplying device (34, 36, 38) for a vehicle, the oil supply device being accommodated within a transmission (2) having a housing (4, 6) with having a plurality of gears (10, 12, 16, 18, 22) disposed therein upon shafts (8, 14, 20), and a switch gear (30, 32, 50) is associated with the plurality of gears (10, 12, 16, 18, 22) and the shafts (8, 14, 20) to facilitate torque transmission by the transmission (2);
   wherein the transmission (2) has a separating device (24) which separates an oil collection reservoir (42) of a first housing part (6) from an oil collection reservoir (44) of a second housing part (4), and the second housing part (4) of the transmission (2) has a raised bottom;
   an oil collecting duct (34) is supported upon movable elements (32, 50) of the switch gear (30, 32, 50) and the oil collecting duct (34) moves with the movable elements (32, 50) of the switch gear (30, 32, 50), the oil collecting duct (34) extends over substantially all of the plurality of gears (10, 12, 16, 18, 22) and the separating device (24) and has a first end which communicates with the first housing part (6) and a second end which communicates with the second housing part (4), and the oil collecting duct (34) is inclined, from the first housing part (6) toward the second housing part (4), and has an intermediate opening (38) therein and, during operation of the transmission (2), a portion of the oil, collected by the oil collecting duct (34), coats an intermediated region of the transmission with oil while a remaining portion of the collected oil flows along the oil collecting duct (34) toward the second housing part (4) and collects in the oil collection reservoir (44) of the second housing part (4).

* * * * *